May 11, 1943.  R. S. DRUMMOND  2,319,117
GEAR CROWNING
Filed July 15, 1940  2 Sheets-Sheet 2

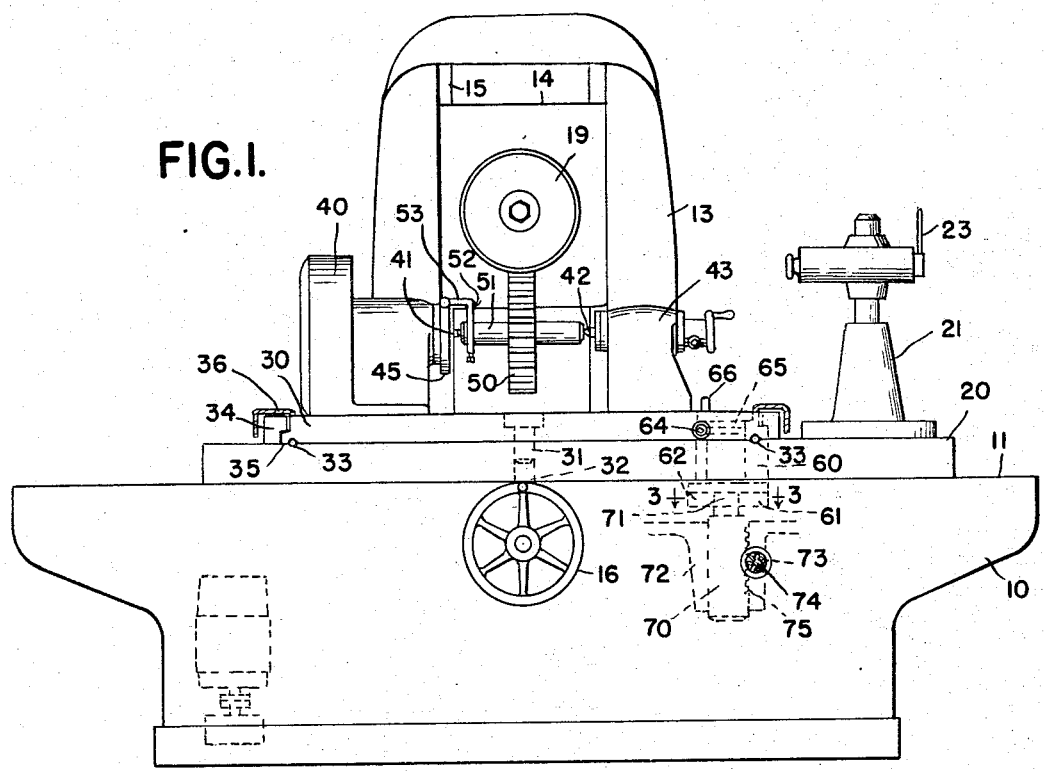

INVENTOR.
ROBERT S. DRUMMOND
BY Whittemore, Hulbert
& Belknap ATTORNEYS

Patented May 11, 1943

2,319,117

UNITED STATES PATENT OFFICE 2,319,117

GEAR CROWNING

Robert S. Drummond, Detroit, Mich.

Application July 15, 1940, Serial No. 345,672

8 Claims. (Cl. 51—124)

The present invention relates to gear finishing and more particularly to the provision of crowned gear teeth by means of a gear grinding machine.. Crowned gear teeth are those which are provided with a high bearing intermediate their ends so that in normal use end contact between mating teeth is avoided. This end contact is avoided even though there be slight misalignment of the shafts of the mating gears or if the shafts have a tendency to become slightly misaligned under load.

The advantages of crowned gear teeth are well recognized but some difficulty has stood in the way of their universal adoption. At the present time satisfactory methods and apparatus have been developed for crowning the teeth of the gear before heat treatment, and gear metallurgy has progressed to a point where teeth crowned prior to heat treatment by certain preferred methods retain their crowned characteristics and are not seriously distorted during heat treatment.

In certain other fields the metal from which gears are made has a tendency to become distorted during heat treatment, and it has been found that gear teeth of this type of gears may or may not satisfactorily be crowned prior to heat treatment. It accordingly becomes necessary for this type of gear to provide for the correct crowning after heat treatment of the gear. The present type of crowning is also adapted in many other fields, and generally it may be said to be useful in crowning any gear teeth, either before or after heat treatment.

Briefly described, this type of crowning is carried out by means of a gear grinding machine and preferably with a formed grinder, that is, a grinder which has its periphery formed of involute cross section so as to engage a side of a tooth of an involute gear. The gear to be crowned is mounted for generally axial translation relative to the formed grinding wheel, and means are provided for translating the gear so as to cause the formed grinding wheel to traverse a tooth space of the gear. Preferably the gear is located so that during the traverse only one side of the tooth space engages the grinder wheel.

During the traverse means are provided for relatively rocking or oscillating the gear and grinder about an axis perpendicular to the axis of the gear, and preferably about an axis perpendicular both to the axis of the gear and to the axis of the grinder. This rocking or oscillation is most conveniently imparted directly to the gear and is in a direction so as to cause the grinder to remove more metal adjacent the end of the gear tooth than centrally thereof.

With the foregoing general remarks in mind, it is an object of the present invention to crown gear teeth by means of a formed grinder.

It is a further object of the present invention to crown gear teeth by means of a formed grinder in which relative translation is provided between the grinder and the gear in conjunction with a timed gradual relative oscillation.

It is a further object of the present invention to crown gear teeth as set forth above by relative oscillation between the gear and grinder about an axis perpendicular to the axis of the gear.

It is a further object of the invention to crown gear teeth in accordance with the foregoing by the relative oscillation between the gear and grinder about an axis which is perpendicular both to the axis of the gear and the axis of the grinder.

It is a further object of the invention to provide novel apparatus for carrying out the present method.

It is a further object of the invention to provide gear grinding apparatus in which a gear supporting platform is mounted for oscillation about an axis perpendicular to the axis of a gear carried thereby.

It is a further object of the present invention to provide novel cam means for causing gradual timed oscillation of a carriage during translation thereof.

Other objects of the invention will be apparent as the description proceeds, and when taken in conjunction with the accompanying drawings wherein:

Figure 1 is a front elevation of the gear grinding machine forming the subject matter of the present invention;

Figure 2 is a plan view of the machine shown in Figure 1;

Figure 3 is a fragmentary section on the line 3—3, Figure 1;

Figure 4:
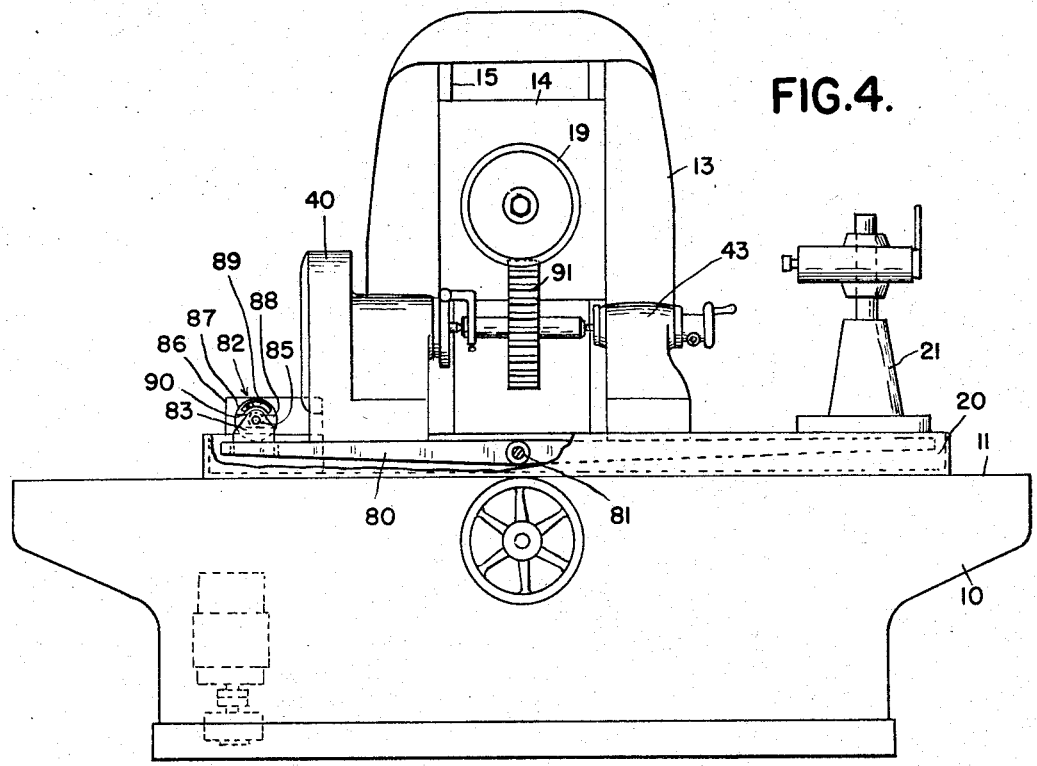
Figure 4 is a front elevation of a modified form of gear finishing machine.

Referring first to Figures 1, 2 and 3, I provide a main frame 10 including a bed 11 provided with longitudinally extending ways indicated at 12 and having a pedestal 13 extending above the bed 11. On the pedestal 13 I provide a vertically adjustable grinder support 14, the support 14 being vertically adjustable in ways 15 provided in pedestal 13. Suitable manual means are provided for effecting vertical adjustment of the grinder support 14. This construction is more or less conventional and it is not thought necessary to illustrate the same in detail, it being desirable only to note that this vertical adjustable means includes a handwheel 16 carried by the frame 10. The grinder support 14 has mounted thereon a motor 17 having a spindle 18 projecting forwardly therefrom above the bed 11 and adapted to carry a formed grinding wheel 19.

Mounted in the ways 12 provided in the bed 11 is a slide 20. Preferably suitable motor means (not shown) are provided for effecting translation of the slide 20 along the ways 12, although this movement of the slide may, if preferred, be effected by suitable manual means.

Rigidly supported adjacent one end of the slide 20 I provide trimming mechanism 21 adapted to cooperate with the grinding wheel 19, and this trimming mechanism includes, as is customary, a pair of trimming points or diamonds 22, as seen in Figure 2. The diamonds 22 are adapted to be swung in accurately controlled paths by means of suitable mechanism actuated by a handle 23. This trimmer mechanism is conventional and its details form no part of the present invention. It may be noted that in order to trim the grinding wheel 19 the slide 20 is traversed to the left, as shown in Figure 1, until the diamonds 22 are directly beneath the axis of the grinding wheel 19. At this time the wheel is rotated and points 22 are swung in their carefully controlled path, as by means of cams or the like, so as to trim the periphery of the grinding wheel 19 to an involute profile.

Supported by the slide 20 I provide a platform 30, which is pivoted to the slide 20 about the axis of a centering pin 31 carried by the platform 30, and received within an opening 32 in the slide 20. In addition, the platform 30 and slide 20 are provided with circular ball races 33 for supporting the platform 30 on the table 20, while at the same time permitting free rocking or oscillation thereof about the axis of the pin 31. I have further indicated at 34 circular guides adapted to extend over flanges 35 formed on the platform 30. Preferably, in order to protect the operating surfaces and the ball races 33 from dust, I provide guards 36 which are carried by the platform 30.

Supported on the platform 30 is an index head 40, which may be of conventional construction and which includes means for locking the gear carried by the machine in place, and for indexing the gear from tooth to tooth in the conventional manner. I have indicated a gear at 50 supported between a center 41 forming part of the index head and a center 42 carried by a tailstock 43. The gear 50 as shown in this figure has a shaft 51, and suitable clamping means 52 are provided to interconnect the gear 50 and the index head. These means include a driving dog 53 received between a pair of threaded abutments 44 carried by and movable with the indexing member 45. The threaded abutments 44 permit fine adjustments of the gear 50 relative to the indexing member.

In order to provide for rocking or oscillating the platform 30 about the vertical axis of the pin 31, I provide a crowning cam indicated generally at 60, the cam being mounted for rotation in the platform 30 and having a depending circular plate 61 provided with a downwardly opening straight slot 62, as best seen in Figure 3. Adjacent the upper portion of the crowning cam 60 I provide suitable adjusting means, including an adjusting worm 64 having a threaded portion meshing with a correspondingly threaded portion 65 on the crowning cam. The adjusting screw 64 is headed so that the same may be gripped or engaged by a suitably formed tool for rotating the screw in a manner to effect adjustment of the cam 60 about its vertical axis.

The cam 60 is provided with a rigid gauge pin 66 which projects above the upper surface of the platform 30, and a fixed gauge block 67 is provided on the upper surface of the platform 30. Very accurate adjustments of the cam may thus be effected by employing a gauge intermediate the gauge pin 66 and the gauge block 67.

As best seen in Figure 3, the slot 62 provided in the lower portion 61 of the crowning cam has flared ends, as indicated at 68, for a purpose which will presently appear. Cooperating with the groove or slot 62 in the crowning cam I provide a pin member 70 which terminates at its top in an elongated portion 71 adapted to be slidably received within the slot 62. Preferably elongated portion 71 is rounded at its ends, as indicated in Figure 3, so as to facilitate engagement between the elongated portion 71 and the slot 62 when the same are separated, as will occur, for example, during trimming of the grinding wheel.

The pin 70 is supported in a sleeve 72 carried by the frame 10, and is vertically adjustable therein. Means are provided for vertically moving the pin 70, and these comprise a pinion 73 mounted for rotation and having an actuating member provided with a squared head, as indicated at 74. The pin 70 is mounted for adjustment along a vertical axis; it is further vertically movable and is provided with rack teeth, as indicated at 75, for cooperation with the teeth of the pinion 73. As will be obvious, the rack teeth 75 are provided around at least a portion of the periphery of the pin 70. By this means it is possible when desired to lower the elongated portion 71 of the pin 70 out of the slot 62, so that translation of the slide 20 and the platform 30 will not result in a corresponding oscillation or rocking of the platform about the axis of the pin 31.

By the means just described, it will be obvious that translation of the table 20 will result in a rocking or oscillation of the platform 30 about the vertical axis of the pin 31 when pin 70 and slot 62 are engaged. Furthermore, the amount of this oscillation or rocking may be accurately controlled by setting the crowning cam 60 so that the slot 62 thereof extends at any desired angle to the ways 12.

It should be noted at this time that the axis of the pin 31, about which the platform 30 rocks, is located directly beneath the median plane of the gear 50, and also in mid position passes through the axis of the grinding wheel 19. It may also be stated at this time that during the crowning operation the parts are set so that when the grinding wheel contacts the teeth of the gear 50 at a point substantially midway between their ends, the platform 30 is in mid position, so that the axis of the gear 50 is parallel to the ways 12 and is perpendicular to the axis of the grinding wheel 19, assuming that the gear 50 is a spur gear.

In order to finish the gear teeth with a desired crown, the complete operation will now be described: The gear 50, preferably after heat treatment, is positioned between the tailstock 43 and the index head 40, and is locked in place by means of the dog 53 and the threaded abutments 44. The threaded abutments are adjusted until the tooth space of the gear 50 is in exact alignment with the lower edge of the grinding wheel 19. At this time the elongated portion 71 of the pin 70 is withdrawn from the slot 62 of the crowning cam 60, and the slide is translated along the ways 12. Undesired rocking of platform 30 is prevented by locking pins 79.

Previously, of course, the grinding wheel 19 was trimmed to the exact shape desired. The translation of the slide 20 causes the grinding wheel to traverse a tooth slot of the gear 50, grinding both sides of the slot to the exact involute curvature desired. This first step may be considered a roughing step.

If desired all of the teeth may be thus rough ground by conventional manipulation of the index head, following translations of the slide 20.

The next step in the operation is to traverse the slide 20 sufficiently to the left so as to bring the trimmer into operative position, and then to trim one side only of the grinder wheel so as to provide a slight clearance between the trimmed side of the grinding wheel and the corresponding side of the tooth slot of the gear 50. The slide 20 is next traversed back to a position which will bring the gear 50 into operative relationship to the grinding wheel 19. The crowning cam 60 will previously have been adjusted to the exact inclination desired, and the pin 70 is now elevated so that the elongated portion 71 thereof is received within the slot 62 of the crowning cam. Conveniently the gear may at this time be centrally located relative to the grinding wheel, as indicated in Figure 1. Due to the fact that one side of the grinding wheel has been slightly trimmed, the grinder will now be in contact only with one side of the tooth slot. The slide 20 is next traversed slowly, and due to the angle of the slot 62 and the direction of translation as determined by the ways 12, the platform 30 will have a gradual timed oscillation during the translation. This oscillation or rocking of the platform 30 is in a direction to cause the side of the tooth slot which engages the grinding wheel to move into the grinding wheel as the contact between the grinding wheel and the tooth shifts toward one end of the gear tooth. This, of course, results in the removal of more metal adjacent the end of the tooth. When the contact between the grinding wheel and the tooth of the gear 50 is at or adjacent the end of the tooth, translation of the slide 20 is reversed and carried past mid position so that the contact between the grinding wheel and the tooth surface shifts gradually to the opposite end of the gear tooth. This reverse translation is, of course, accompanied by a reverse oscillation or rocking of the platform 30 about the axis of the pin 31, and results in removing more metal adjacent the opposite end of the gear tooth. One side of one gear tooth is now crowned. If desired, the gear may now be indexed around from tooth to tooth, so that upon a complete rotation of the gear one side of all gear teeth will have been crowned.

The next step in the operation is to position the gear centrally relative to the grinding wheel 19, and to effect an adjustment of the gear about its axis by means of the threaded abutments 44, so that the sides of the gear teeth, which have so far not been crowned, will come into contact with the grinding wheel, and clearance will be introduced between the grinding wheel and the sides of the gear teeth which have already been crowned. At this time the cam will be adjusted to have an opposite inclination relative to the ways 12, this adjustment of the cam being effected by means of the cam adjusting screw 64 in conjunction with a suitable gauge received between the gauge pin 66 and the gauge block 67. At this time the slide 20 is again traversed, and this traverse will be accompanied by a gradual timed rotation or oscillation of the platform 30 relative thereto, by reason of the cam slot 62 and the elongated portion 71 of the pin 70. It will be noted that the rocking or oscillation of the platform will now be in an opposite sense to that effected during the first operation, due to the opposite inclination of the slot 62.

It will be apparent that under certain circumstances it may be unnecessary to trim one side of the grinder so as to provide clearance, but this ordinarily will be desirable to prevent interference.

Figure 5:
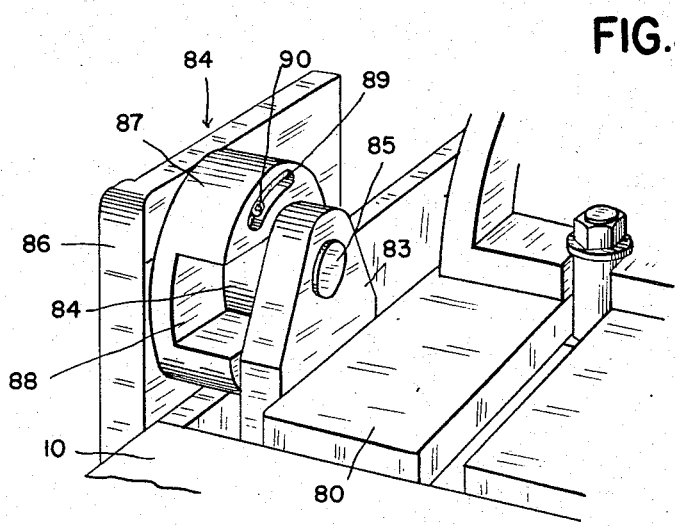
Figure 5 is a detail perspective showing the camming means of the machine illustrated in Figure 4.

Referring now to Figures 4 and 5, I have illustrated a somewhat different embodiment of my invention. In these figures I have illustrated a frame 10 having a pedestal 13 which carries grinder support 14, as in the previous embodiment. The table 10 is likewise provided with a longitudinally movable slide 20 which carries a trimmer 21, as in the previous modification.

In this modification the platform 80 is mounted on the slide 20 for adjustment about an axis of a horizontal pivot 81, which is parallel to the axis of the grinding wheel 19, for spur gears. The platform 80 carries the index head 40, the tailstock 43, and associated mechanism identical with that described in Figures 1 to 3.

Means are provided for traversing the table 20 longitudinally in a direction perpendicular to the axis of the pivot support 81, and in addition means are provided for imparting to the platform 80 a gradual timed rocking or oscillation about the axis of the pivot support 81. These last means take the form of an inclined cam slot and follower, indicated generally in Figure 4 at 82 and shown in detail in Figure 5. In Figure 5 the platform 80 is shown as provided with a plate 83 having a roller 84 carried thereby, as by means of a pin 85. The frame 10 has an upstanding bracket 86, to which is adjustably secured a cam 87 having an elongated slot 88 formed therein. The cam 87 is adjustable about a horizontal transverse axis, suitable securing means including an elongated slot 89 and bolt 90 being provided. As will be apparent, translation of the table 20 and platform 80 will result in a slow timed rocking or oscillation of the platform 80 about the axis of the pivot connection 81.

In this type of machine the operation is somewhat simplified, for the reason that it is unnecessary to provide an intermediate trimming step for the grinding wheel. If preferred, the gear may be traversed without rocking or oscillation relative to the grinding wheel to take a rough grind. This may be done by setting slot 88 horizontal, or disengaging roller 84 from the slot. Following this the roller 84 is engaged in the inclined slot 88, or the slot set at an angle, and during the next translation of the table 20 and platform 80, the platform will rock about the axis of the pin 81. The cam 87 is so located relative to the axis of the roller 84 that when the grinding wheel contacts the teeth of the gear 91 at their center the axis of the gear will be horizontal. As the contact between the grinding wheel 19 and teeth of the gear 91 shifts toward one end of the gear teeth, the rocking motion or oscillation of the gear 91 will be in a direction such that the ends of the gear teeth move upwardly relative to the grinding wheel, so as to cause the grinding wheel to remove more metal from both sides of the tooth slot being ground adjacent the end of the slot. Reverse translation of the slide 20 results in a reverse rocking or oscillation of the platform 80, which will pass through a mid position in which the axis of the gear 91 is horizontal, and the contact between the grinding wheel 19 and the gear 91 has again reached the center of the gear. As the contact between the grinding wheel 19 and the teeth of the gear 91 approaches the opposite end of the gear teeth, the gear is rocked so that again more metal is removed adjacent the ends of the teeth than centrally.

As will be apparent, this operation will result in crowning the teeth of the gear in a manner substantially similar to the crowned teeth produced by the machine shown in Figures 1 to 3. Since both sides of the tooth slot are ground simultaneously, the operation may be somewhat more rapid. On the other hand, the two operations will create differently shaped relieved or crowned tooth surfaces, so that one or the other may be desired for a specific result.

For simplicity, I have illustrated and described the present invention as employed with spur gears, but it will be apparent that the invention may be duplicated for helical gears, with the following considerations in mind: For finishing a helical gear the grinding wheel will first be set around so that its axis is oblique to the axis of the gear, and so that the formed periphery of the grinding wheel be received properly within a helical tooth slot. In addition the translation of the gear in the direction of its axis must be accompanied by a corresponding rotation of the gear about its axis to take care of the lead of the gear. Suitable mechanism performing this function are already known to the art, and the details thereof form no part of the present invention.

The crowning of gears is of particular importance where such gears are under high stresses, as in airplane motors and the like. Under these conditions the gears as well as the mountings may be considerably distorted and the bearing between the gears thus shifts one end of the teeth of the gear and causes breakage.

Airplane gears can be most economically produced by hobbing the teeth, then finish shaving to the crowned bearing as disclosed in my prior Patent No. 2,157,981, or otherwise, then heat treating the gear, followed by the final form grinding operation, as fully disclosed in the foregoing. The reason for the foregoing steps of manufacture is that crowned shaving of the gear teeth is more economical and more rapid than the similar operation performed by a grinding machine. By first shaving the tooth to the crowned form, less material is left for removing at the final grinding operation.

The amount of crowning, as previously stated, is determined by the setting of the cam and, of course, duplicate settings can be obtained by the use of a gauge bar.

Another consideration of importance is the fact that the center of the high point of the crown thus provided may be placed anywhere along the gear tooth by repositioning the work between the centers. In other words, the center of the crown will be located at the portion of the tooth above the axis of oscillation, and by adjusting the centers this may be located at any particular point between the ends of the gear teeth. This is of particular importance for the reason that it is found that on some jobs with different directions of rotation, it is desirable to offset the crowned bearings on opposite sides of the teeth.

The crowning of the teeth of the gear insures that the bearing will be in the center of the tooth or adjacent the center of the tooth and never at the ends of the teeth. In addition to giving much safer construction as regards breakage of the gears, this also insures quieter operation.

While I have illustrated and described two specific embodiments of my improved gear grinding apparatus, it will be understood that the same has been done solely to enable those skilled in the art to practice the invention, the scope of which is indicated by the appended claims.

What I claim as my invention is:

1. The method of crown grinding the teeth of a gear which comprises rotating a formed grinding wheel formed to grind the confronting faces of adjacent teeth simultaneously, relatively translating a gear to be ground and said grinding wheel to form uncrowned tooth surfaces, trimming one side of said wheel to provide clearance, again relatively translating said gear and grinding wheel, and, during said second relative translation, providing a timed gradual relative oscillation between said gear and grinding wheel about an axis substantially perpendicular to the axis of said gear, said oscillation being a maximum when said grinding wheel contacts the teeth of said gear adjacent their ends, whereby to crown one side of a gear tooth, relatively adjusting said gear and grinding wheel about the axis of said gear to position the adjacent face of the adjacent tooth of said gear in grinding position and to provide clearance for the said one crowned side, and again relatively translating said gear and grinding wheel and simultaneously gradually relatively oscillating said gear and grinding wheel in timed relation to said translation about an axis perpendicular to the axis of said gear and the axis of said grinding wheel, said oscillation being a maximum when said grinding wheel contacts the teeth of said gear adjacent their ends, whereby to crown the adjacent face of said adjacent tooth.

2. The method of crown grinding the teeth of a gear which comprises rotating a formed grinding wheel formed to grind the confronting faces of adjacent teeth simultaneously, relatively translating a gear to be ground and said grinding wheel to form uncrowned tooth surfaces, trimming one side of said wheel to provide clearance, again relatively translating said gear and grinding wheel, and, during said second relative translation, providing a timed gradual relative oscillation between said gear and grinding wheel about an axis substantially perpendicular to the axis of said gear and the axis of said grinding wheel, said oscillation being a maximum when said grinding wheel contacts the teeth of said gear adjacent their ends, whereby to crown one side of a gear tooth, relatively adjusting said gear and grinding wheel about the axis of said gear to position the adjacent face of the adjacent tooth of said gear in grinding position and to provide clearance for the said one crowned side, and again relatively translating said gear and grinding wheel and simultaneously gradually relatively oscillating said gear and grinding wheel in timed relation to said translation about an axis perpendicular to the axis of said gear and the axis of said grinding wheel, said oscillation being a maximum when said grinding wheel contacts the teeth of said gear adjacent their ends, whereby to crown the adjacent face of said adjacent tooth.

3. The method of crowning gear teeth with a formed grinder which comprises positioning said grinder in an interdental space of a gear in contact with a tooth surface thereof, relatively feeding said gear and grinder in a direction to cause contact of said grinder and said tooth surface to shift longitudinally on said tooth surface, and simultaneously in timed relation to said feed, gradually relatively rocking said grinder and gear about an axis which is perpendicular both to the axis of said gear and to the axis of said grinder.

4. The method of crowning the surface of a gear tooth which comprises providing a formed grinder wheel, feeding a gear axially such that said grinder wheel passes through a tooth space on said gear, and simultaneously, in timed relation to said feed, gradually rocking said gear about an axis which is perpendicular both to the axis of said gear and to the axis of said grinder wheel.

5. The method of crowning the surface of a spur gear tooth which comprises providing a formed grinding wheel having a surface shaped to conform to the surface of said tooth, positioning said gear with its axis in a plane perpendicular to the axis of said grinding wheel and with a tooth space aligned with said wheel, feeding said gear axially to cause said grinding wheel to pass through said tooth space, and simultaneously, in timed relation to said feed, gradually superimposing on said gear a rocking motion about an axis perpendicular both to the axis of said gear and to the axis of said grinding wheel which displaces said gear an amount which varies from zero when said grinding wheel contacts said tooth surface centrally to a maximum when said grinding wheel contacts said tooth surface adjacent an end of said tooth.

6. A gear crowning machine comprising a frame, a support on said frame for a form grinding wheel, means for rotating said wheel about its axis, ways on said frame, a slide movable in said ways in a direction transverse to the axis of said grinding wheel, a platform on said slide, means on said platform for supporting a gear, pivot means supporting said platform on said slide for oscillation about an axis perpendicular both to the axis of said gear and to the axis of said grinding wheel, means for translating said slide, and means for oscillating said platform in accordance with said translation.

7. A gear crowning machine comprising a frame, a support on said frame for a form grinding wheel, means for rotating said wheel about its axis, ways on said frame, a slide movable in said ways in a direction transverse to the axis of said grinding wheel, a platform on said slide, means on said platform for supporting a gear, pivot means supporting said platform on said slide for oscillation about an axis perpendicular to the axis of said gear, means for translating said slide, and means for oscillating said platform in accordance with said translation, said last means comprising an adjustable member having a slot therein carried by said platform, and a pin carried by said frame engageable in said slot, said member and pin being relatively adjustable whereby said pin may be withdrawn from said slot when desired.

8. A gear crowning machine comprising a frame, a support on said frame for a form grinding wheel, means for rotating said wheel about its axis, ways on said frame, a slide movable in said ways in a direction transverse to the axis of said grinding wheel, a platform on said slide, means on said platform for supporting a gear, pivot means supporting said platform on said slide for rocking movement about an axis perpendicular to the axis of said gear, a wheel trimmer on said slide, means for translating said slide, and means for rocking said platform in accordance with said translation, said last means comprising a member having an open-ended slot therein, a pin adapted to be received in said slot, said member and pin being mounted between said frame and said platform, said pin being relatively movable out of an open end of said slot when said slide is translated to bring said trimmer into operative relation relative to said wheel.

ROBERT S. DRUMMOND.